(12) United States Patent
Harrison et al.

(10) Patent No.: US 6,601,995 B1
(45) Date of Patent: Aug. 5, 2003

(54) OPTICAL CONNECTOR WITH FLEXIBLE SHIELDING COVER

(75) Inventors: Carl G. Harrison, Plano, TX (US); Bradley S. Hoyl, Frisco, TX (US); Denise L. Smart, Plano, TX (US)

(73) Assignee: Cisco Technology, Inc, San Jose, CA (US)

(*) Notice: Subject to any disclaimer, the term of this patent is extended or adjusted under 35 U.S.C. 154(b) by 18 days.

(21) Appl. No.: 09/586,581

(22) Filed: Jun. 2, 2000

(51) Int. Cl.[7] .................................................. G02B 6/36
(52) U.S. Cl. .......................................... 385/77; 439/142
(58) Field of Search ........................... 385/76, 139, 77, 385/134; 439/138, 142, 144

(56) References Cited

U.S. PATENT DOCUMENTS

| | | | |
|---|---|---|---|
| 2,751,488 A | * | 6/1956 | Morrison |
| 4,640,575 A | * | 2/1987 | Dumas .......................... 385/76 |
| 4,696,438 A | | 9/1987 | Myers ..................... 242/118.41 |
| 4,767,179 A | * | 8/1988 | Sampson |
| 4,783,954 A | | 11/1988 | Akre ................................ 57/9 |
| 4,792,203 A | | 12/1988 | Nelson et al. .............. 350/96.2 |
| 4,990,723 A | * | 2/1991 | Ziberna et al. |
| 4,995,688 A | | 2/1991 | Anton et al. ................ 350/96.1 |
| 5,013,121 A | | 5/1991 | Anton et al. ................ 350/96.2 |
| 5,066,149 A | | 11/1991 | Wheeler et al. ............. 385/135 |
| 5,067,678 A | | 11/1991 | Henneberger et al. ...... 248/68.1 |
| 5,179,618 A | | 1/1993 | Anton .......................... 385/136 |
| 5,208,894 A | | 5/1993 | Johnson et al. .............. 385/135 |
| 5,214,735 A | | 5/1993 | Henneberger et al. ....... 385/136 |
| 5,287,426 A | | 2/1994 | Shahid ........................... 385/85 |
| 5,301,884 A | | 4/1994 | Horneman .................. 242/7.09 |
| 5,316,243 A | | 5/1994 | Henneberger et al. ...... 248/68.1 |
| 5,339,379 A | | 8/1994 | Kutsch et al. ............... 385/135 |
| 5,497,444 A | | 3/1996 | Wheeler ...................... 385/135 |
| 5,717,810 A | | 2/1998 | Wheeler ...................... 385/135 |
| 5,758,003 A | | 5/1998 | Wheeler et al. ............. 385/134 |
| 5,761,368 A | | 6/1998 | Arnett et al. ................ 385/134 |
| 5,795,177 A | * | 8/1998 | Hirono .......................... 439/78 |
| 5,909,526 A | | 6/1999 | Roth et al. ..................... 385/78 |
| 5,915,062 A | | 6/1999 | Jackson et al. .............. 385/137 |
| 5,946,440 A | | 8/1999 | Puetz .......................... 385/135 |
| 5,956,444 A | | 9/1999 | Duda et al. .................... 385/53 |
| 5,984,531 A | | 11/1999 | Lu ............................... 385/60 |
| 6,041,155 A | * | 3/2000 | Anderson .................... 385/139 |
| 6,076,975 A | | 6/2000 | Roth ............................ 385/76 |
| 6,206,577 B1 | | 3/2001 | Hall, III et al. ................ 385/53 |

OTHER PUBLICATIONS

Bryan A. Tozer; "Telecommunications Systems: Minimize Laser Risks"; Feb. 1999; *Phontonics Spectra;* pp. 124–126.

* cited by examiner

*Primary Examiner*—Neil Abrams
(74) *Attorney, Agent, or Firm*—Campbell Stephenson Ascolese LLP

(57) ABSTRACT

A unitary-construction shielding system obstructs an energy source opening within a connector housing when no connector is present within the housing. The shield is at least as wide as the energy source opening and is configured to rest in a position, when no connector is present in the housing, that obstructs the laser source opening. When a connector is inserted into the connector housing, the connector supplies an obstruction force to the shielding device, causing the shielding device to remain in a deflected position. When the connector is removed from the connector housing, and the obstruction force is therefore removed from the shielding device, and the bias portion of the shielding device causes the device to return to a rest position that again obstructs the energy source opening. A method for providing a shielding system provides that the installation and removal of the shielding device may be accomplished without removing the connector from the connector housing.

24 Claims, 15 Drawing Sheets

350

350

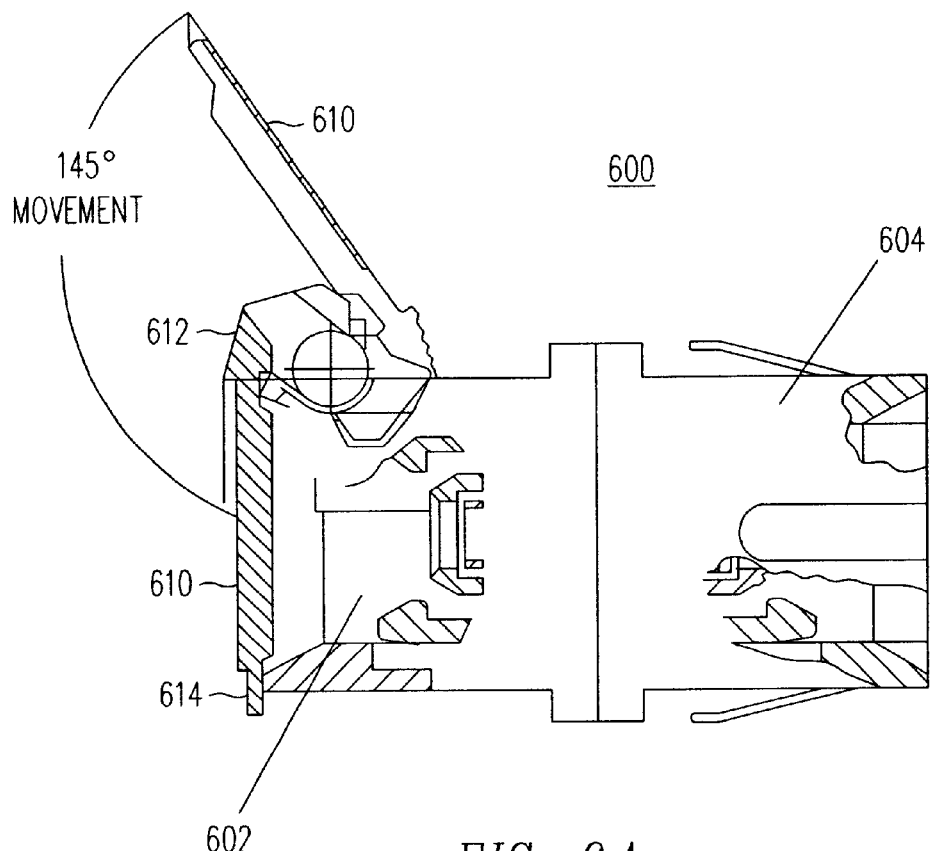
FIG. 6A
(Prior Art)
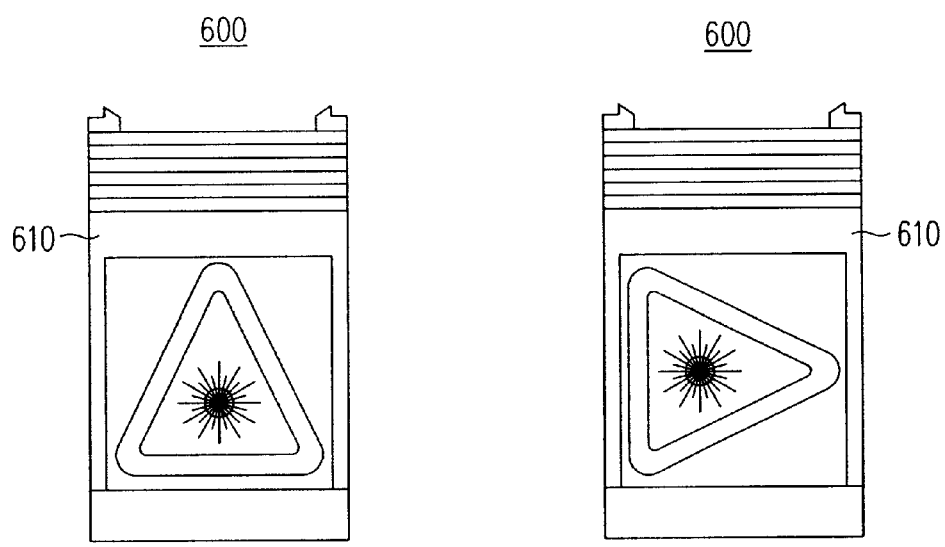
FIG. 6C
(Prior Art)
FIG. 6B
(Prior Art)

OPTICAL CONNECTOR WITH FLEXIBLE SHIELDING COVER

CROSS-REFERENCE TO RELATED APPLICATION

This application relates to U.S. patent application Ser. No. 09/586,420, filed concurrently herewith, now U.S. Pat. No. 6,375,363 and entitled, "Multi-part Optical Safety Clip," and naming Bradley S. Hoyl, Denise L. Smart, and Carl G. Harrison as inventors, the application being incorporated herein by reference in its entirety.

BACKGROUND OF THE INVENTION

1. Field of the Invention

The present invention relates to fiber optic telecommunications equipment and, in particular, to a shielding system and method for providing protection from laser energy emitted from a fiber optic cable.

2. Description of the Related Art

In the telecommunications and data transmission industries, optical fibers are used to transmit signals. The technology uses glass or plastic threads (fibers) to transmit data. A fiber optic cable consists of a bundle of glass threads, each of which is capable of transmitting messages modulated into light waves. Lasers provide the source for the light waves in a fiber optic communications system. The lasers in optical fiber communications systems operate at wavelengths ranging from about 600 nm to about 1550 nm. Today's fiber optic communications systems are growing larger and stronger, with higher intensity laser signals being driven over a larger number of optical fibers.

A hazard associated with fiber optic communications systems, because they employ laser technology, is the risk of harm to humans from exposure to laser light waves. Typical optical fiber communications systems are fully enclosed when operating normally. However, human exposure is possible when the closed system is broken, either intentionally or by accident. In such cases, there is a risk of harm to the human eye if certain portions of the eye are exposed to intense laser radiation. For instance, when laser radiation at wavelengths shorter than 1400 nm are focused on a very small point on the retina, local heating can result in damage to the photosensitive receptors in the retina. In most cases where excessive exposure occurs, the damage is permanent. If the radiation is focused on the portion of the eye called the macula, serious loss of central vision may occur. At 1550 nm, the anterior portions of the eye absorb the radiation. This may result in excessive heating, which may lead to corneal burning or cataract. Because the radiation at these longer wavelengths is not focused, the threshold for biological damage is greater than at shorter wavelengths.

What is needed is a system and method for shielding the operator of a fiber optic communications system from laser energy, while at the same time being practical for the operator to employ as well as requiring as little space as possible within a densely packaged fiber optic cabling system. It would also be desirable for the method and system to provide shielding without regard to the style of commercial connector used in the fiber optic communications system.

SUMMARY OF THE INVENTION

A shielding system includes a unitary-construction shielding device that automatically obstructs the energy source opening of a connector housing when no connector is present within the housing. In at least one embodiment, the shielding system includes a flexible shielding device that includes a relatively planar bias portion coupled between a fastening plate and a shield portion. The shield is at least as wide as the energy source opening and is configured to rest in a position, when no connector is present in the housing, that automatically obstructs the energy source opening. When a connector is inserted into the connector housing, a pressure force is applied to a ledge. The ledge is integrally coupled to the shield. The pressure force causes the bias portion to flex into a position that clears the energy source opening. In this manner, a connector may be inserted into the connector housing. While the connector remains in the connector housing, the connector supplies an obstruction force to the shielding device, causing the shielding device to remain in a yielded position. When the connector is removed from the connector housing, and the obstruction force is therefore removed from the shielding device, the bias portion of the shielding device causes the device to return to a rest position where the shield again obstructs the energy source opening. The installation and removal of the shielding device may be accomplished without removing the connector from the connector housing.

In at least one embodiment, the shielding system includes multiple shielding devices coupled to the fastening plate. The shielding devices and fastening plate are of a unitary construction. In one embodiment, they are constructed from a single metal sheet that is formed and bent accordingly to form the fastening plate, bias portion, shields, and ledge. In another embodiment, the fastening plate, bias portion, shields, and ledge are molded from plastic.

In at least one embodiment, the shielding device is configured such that the pressure force and the obstruction force cause the shielding device to yield along a plane perpendicular to the fastening plate.

In one embodiment, the fastening plate contains a mounting notch along an inside edge of a side portion of the fastening plate. In another embodiment, the fastening plate contains two mounting notches, one each on a first side edge and a second side edge of the fastening plate.

In at least one embodiment, the shielding system is coupled to a housing chassis. The housing chassis contains at least one connector housing into which an optical connector may be inserted. In at least one embodiment, the chassis contains multiple connector housings.

BRIEF DESCRIPTION OF THE DRAWINGS

The present invention may be better understood, and its numerous objects, features, and advantages made apparent to those skilled in the art by referencing the accompanying drawings.

FIG. 1, which includes

FIG. 4, which includes

FIG. 5, which includes

FIG. 6, which includes FIGS. 6A, 6B, and 6C, illustrates a simplex SC shuttered optical connector adapter.

FIG. 9, which includes

FIG. 10, which includes

DETAILED DESCRIPTION

Various safety precautions have been employed in an attempt to protect humans from damaging exposure to laser radiation in the fiber optic communications context. Two of these approaches include misdirection and blocking. Both of these approaches are employed at places within the fiber optic communications system where a break is likely to occur.

In a fiber optic communications system, breaks in the system are likely to occur at connectors. That is, from time to time it is necessary to splice, join, or otherwise join optical fiber cables. A plurality of optical fiber cable connectors are known in the industry and are commercially available. The connectors are designed to be removable and a break in the system will therefore occur whenever one of these removable connectors is disconnected from the fiber optic communications system.

Figure 1A:
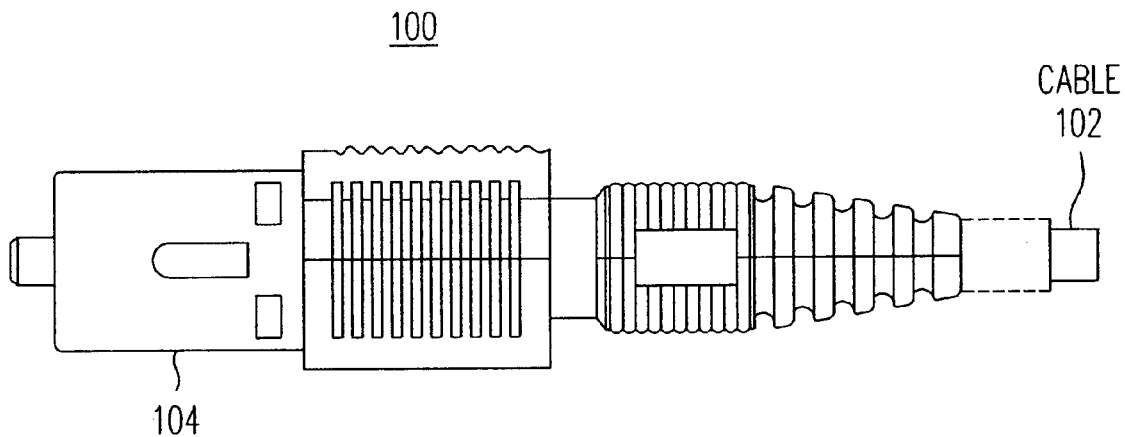
FIG. 1A and FIG. 1B, is a side view of an SC optical connector.
Figure 1B:
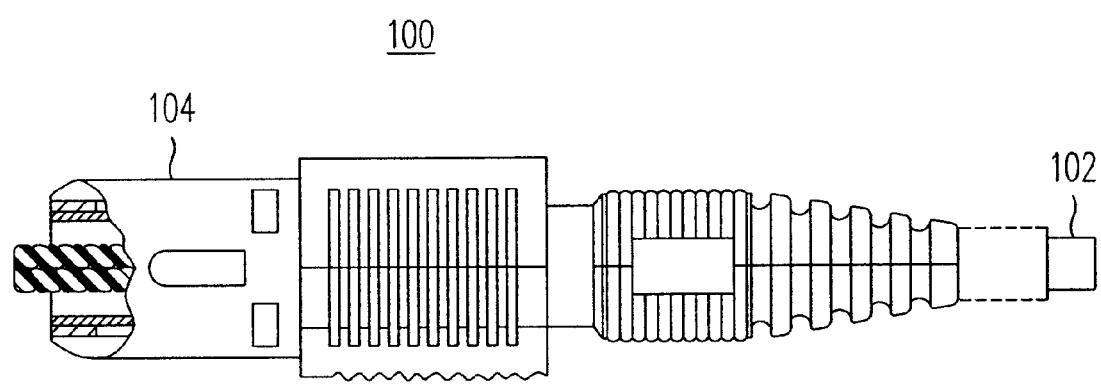

FIG. 1 is a side view of a commonly available optical connector 100. The connector 100 conforms to a standard known as NTT-SC and is referred to as square connector ("SC") connector. Nippon Telephone and Telegraph ("NTT") developed the SC standard, whose name refers to the square shape of the connectors. Each connector 100 surrounds the end of an optical cable 102 and provides a mechanism 104 for the optical cable 102 to be mated with a second connector (not shown). When the connector 100 is mated with the second connector, a connection is created between the two optical cables. This general scheme is true of other types of commercially available connectors as well, such as the ST and FC connectors discussed below.

Figure 2:
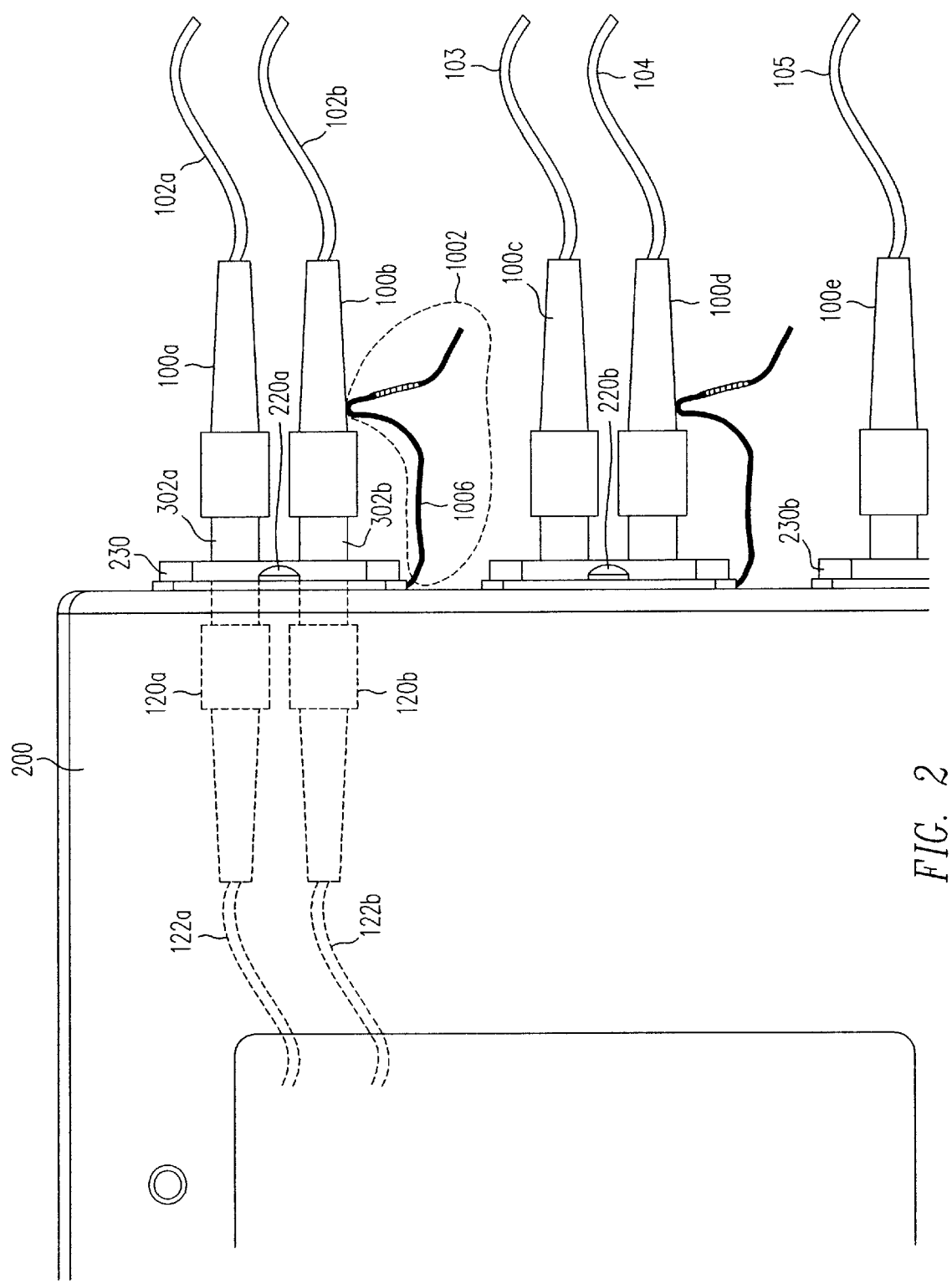
FIG. 2 is a side view of a shielding system according to one embodiment of the present invention, where the shields are in a yielded position to accommodate optical connectors.

FIG. 2, a side view, illustrates that connectors 100 are mounted on a housing chassis 200. Most typical fiber optic communications systems include multiple optical cables 102, 103, 104, 105. In order to organize these cables 102–105 into a manageable system, multiple connectors 100 are mounted onto the housing chassis 200. One such housing chassis 200 is the Wavelength Router 15900 Customer Interface Bay produced by Cisco Systems, Inc., which is based in San Jose, Calif. The Wavelength Router provides a housing for 512 optical connections (i.e., 64 connectors 100, 120) that are assembled into 32 16-port configurations. Connections between fiber optic cables (102, 122) are effected by coupling mating connectors 120 from within the housing chassis 200 to the connectors visible from the front of the housing chassis 200. This mating of connectors is facilitated by adapters, which are discussed further below.

FIG. 2 illustrates that, in the Wavelength Router, as with any other housing chassis 200, the connectors 100, 120 mounted thereon can be configured within the fiber optic communications system to be "receive" connectors or "transmit" connectors. The "receive" connectors 100b, 120a surround the end of a fiber cable 102b, 122a that is configured to receive a laser signal. The "transmit" connectors 100a, 120b surround the end of a fiber cable 102a, 122b that is configured to transmit a laser signal. The transmit connectors 100a, 120b are the only ones from which a laser signal radiates, and therefore these transmit connectors 100s, 120b are the ones that pose the potential human safety threat discussed above.

Figure 7:
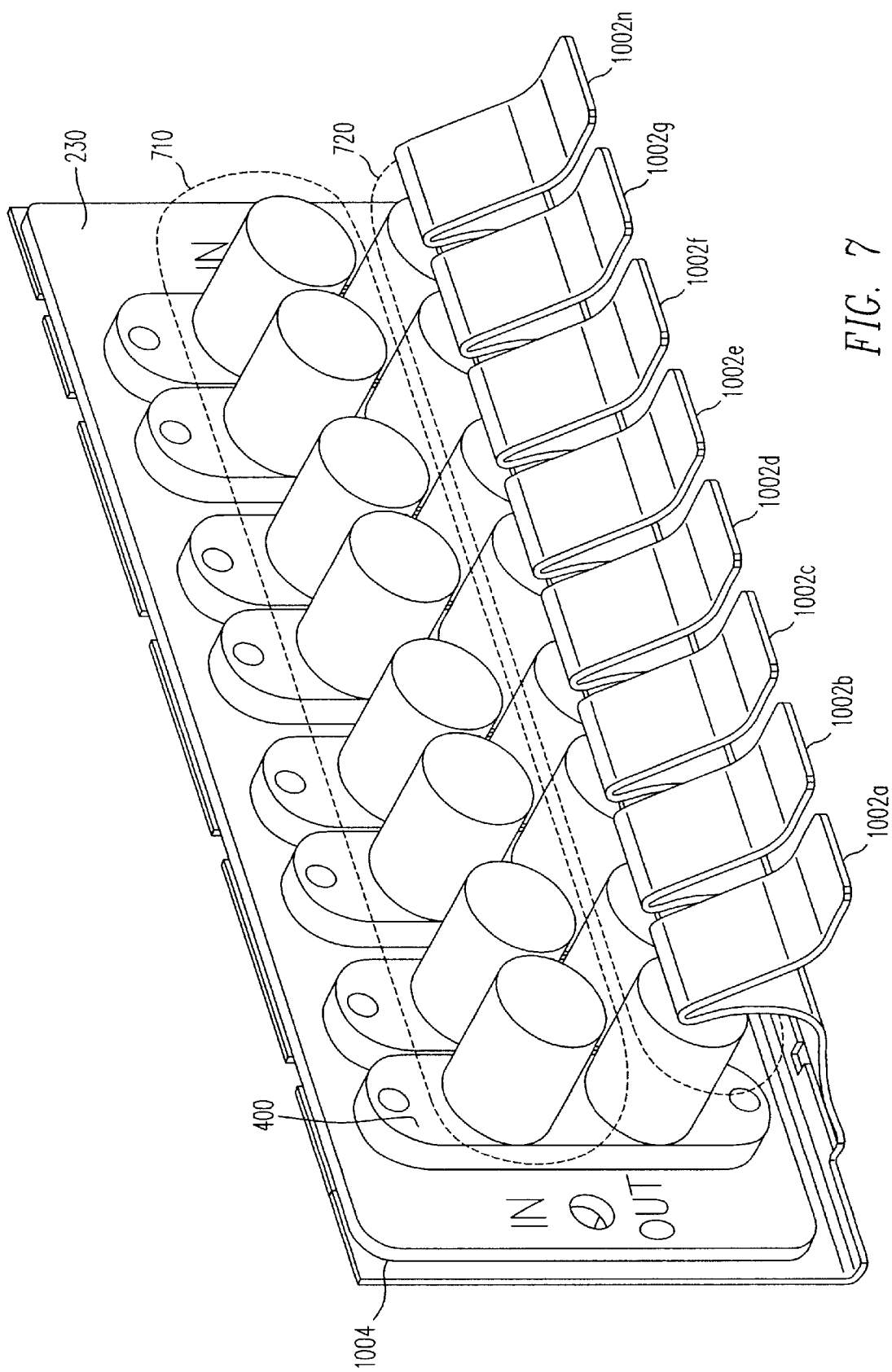
FIG. 7 is a plan view of a shielding system according to one embodiment of the present invention, where the shielding system is employed in conjunction with a 16-port interface panel.
Figure 8:
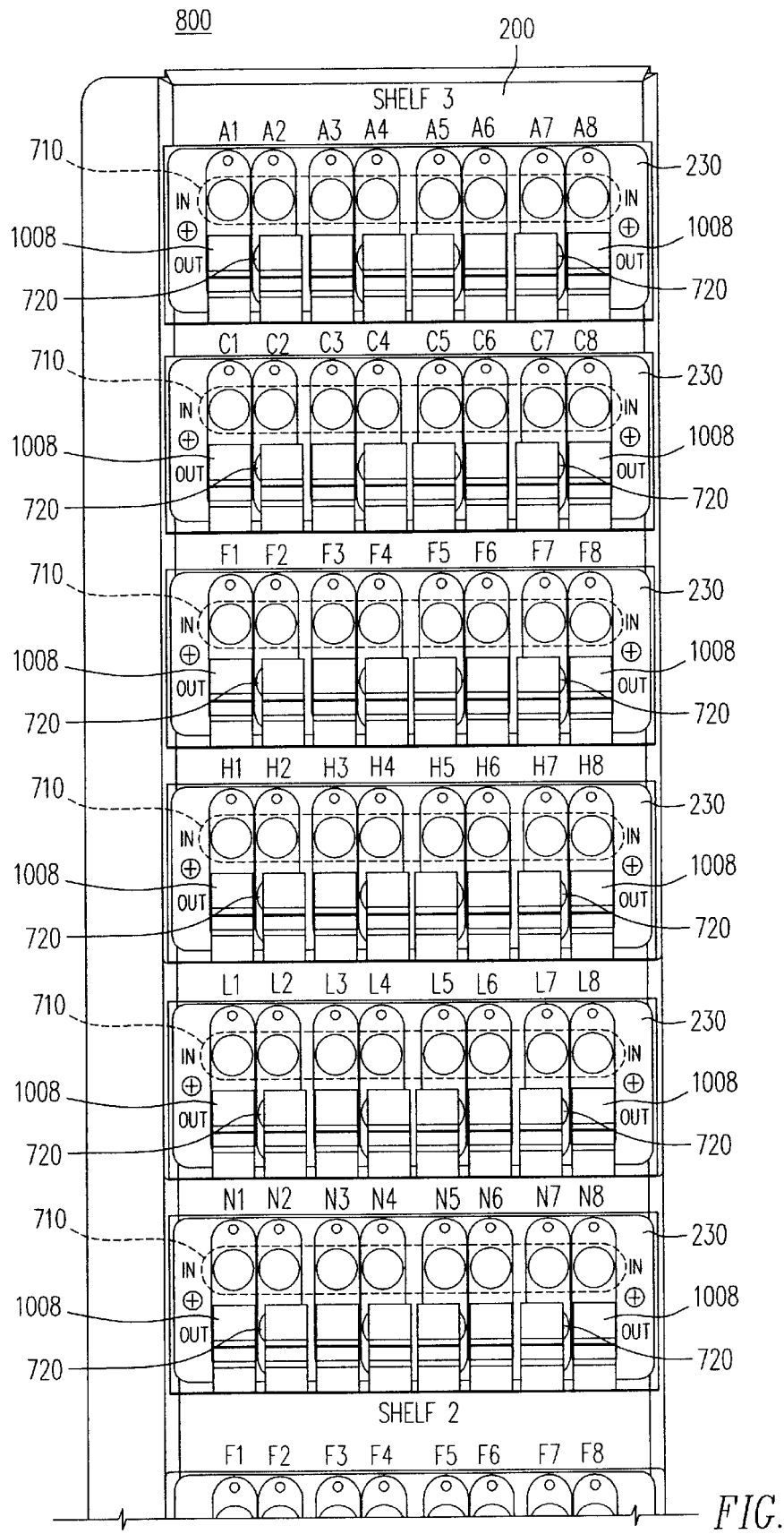
FIG. 8 is a front view of an optical fiber communications system that utilizes multiple shielding systems in accordance with at least one embodiment of the present invention.

FIGS. 2, 7, and 8 illustrate that transmitting connectors can be placed outside the housing chassis 200, and can also be placed inside the housing chassis 200. In the Wavelength Router housing chassis 200, the connectors 100 are situated such that, for each of the 32 16-port configurations, each connector port 720 in the lower row of connector ports is labeled as an "out" port 720. Each of the ports 710 in the upper row of ports is labeled as an "in" port. The relative terms "in" and "out" are used with reference to an operator standing outside the housing chassis 200 and facing it. In other words, it is from out ports 720 that transmitting connectors 120b radiate potentially harmful laser energy toward an operator. While transmitting connectors 100a can also radiate laser energy through the "in" ports 710 toward the interior of the chassis, this transmission does not usually pose a risk to operators such as repair personnel and other technicians, who usually position themselves outside the housing chassis and facing the "in" and "out" ports.

FIGS. 3A through 5B illustrate various types of adapters 300, 400, 500 that are used to facilitate the mating of connectors to form connections between optical cables. When a connector 100 is mounted on the housing chassis 200, it is usually mounted into an adapter 300, 400, 500. An adapter is a housing that is used to facilitate a connection between two connectors. Common adapters either facilitate a single connection between two cable connectors 100 (i.e., a simplex adapter 350) or come in the form of duplex adapters 300, 400, 500 in which two connections (i.e., four connectors) are mated.

Figure 3B:
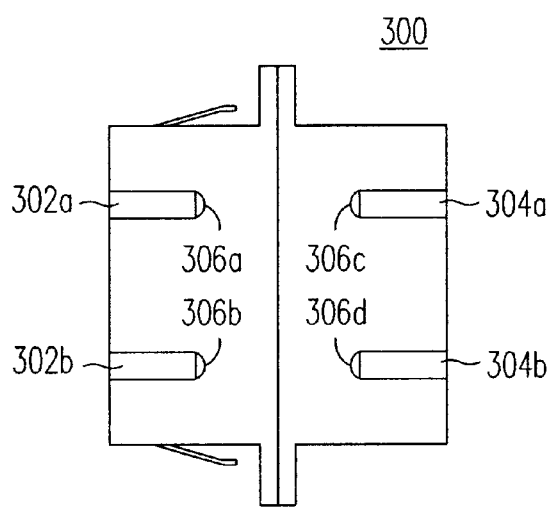
FIGS. 3A, 3B, and 3C are plan, side, and front views, respectively, of a duplex SC-to-SC optical connector adapter.
Figure 3C:
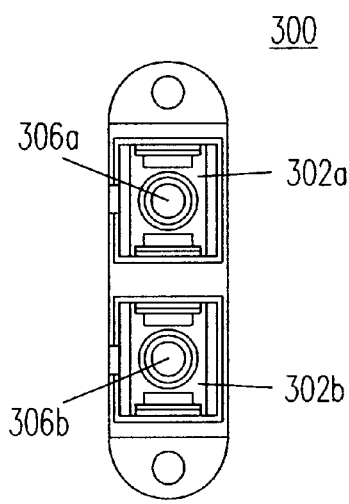
Figure 3A:
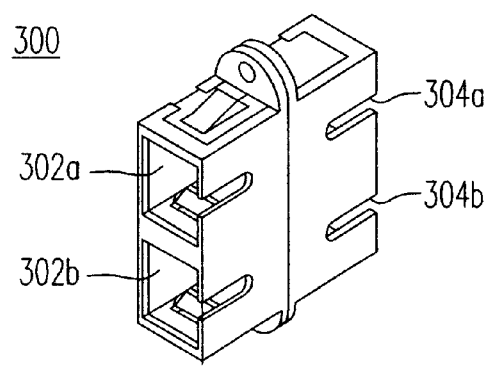
Figure 3D:
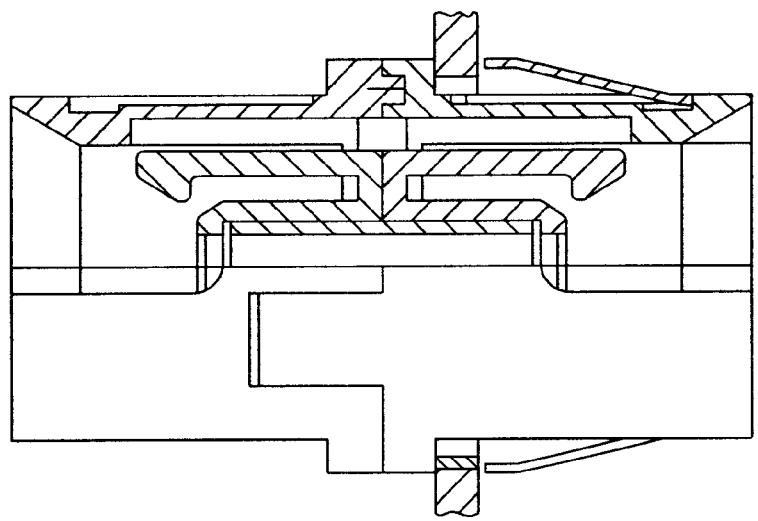
FIGS. 3D and 3E are side and front views, respectively, of a simplex SC optical connector adapter.
Figure 3E:
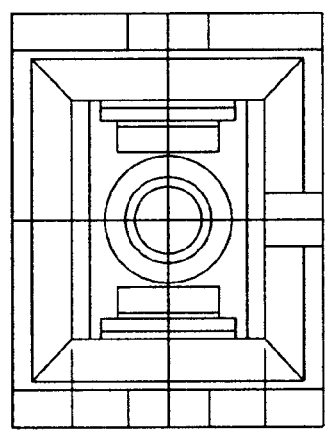

FIGS. 2, 3A, 3B and 3C serve as a reference for discussing properties common to most typical adapters 300, 350, 400, 500. The adapter 300 forms connector housings 302, 304 into which each removable connector 100, 120 may be placed. The adapter 300 is shaped to form a housing 302 into which the first connector 100 fits. The adapter is shaped to form a second housing 304 into which the second connector 120a fits to create a mated connection between the first 100a cable 102a and the second connector's 120a cable 122a. FIG. 3B illustrates that the housings 302, 304 are shaped to form an opening 306 through which the laser energy can transfer between the cables 102, 122 mated in a connection. If a transmitting connector 120b is inserted into one of the housings 304 but not the other 302, then the potentially hazardous "broken system" condition discussed above may exist. That is, if the connector 120b inserted into the second housing 304 is a connector for a cable 122b that is transmitting a laser signal, then that signal can emit from the laser energy opening 306 when a mating connector 100b is not inserted into connector housing 302. As is discussed below, the present invention provides shielding in this situation by blocking the laser energy opening 306.

Figure 4B:
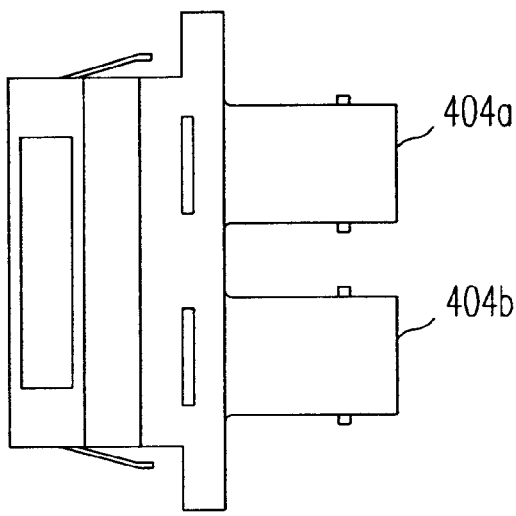
FIGS. 4A, 4B, and 4C, illustrates a duplex SC-to-ST optical connector adapter.
Figure 4C:
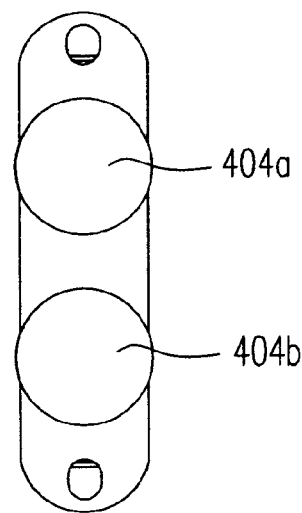
Figure 4A:
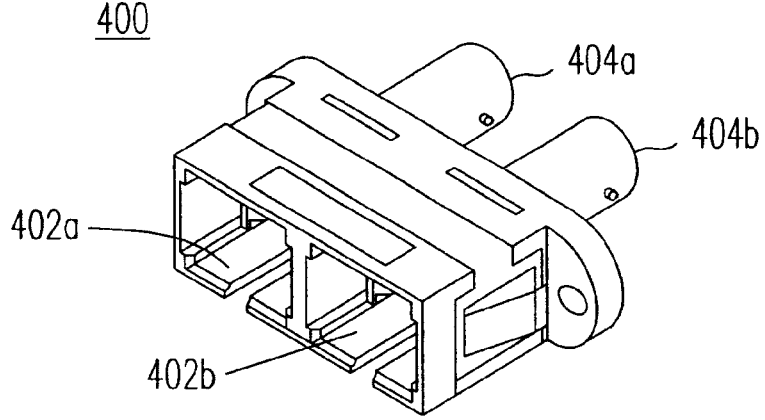
Figure 5B:
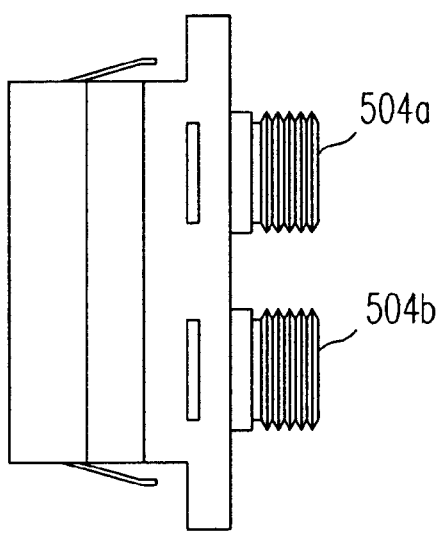
FIGS. 5A, 5B, and 5C, illustrates a duplex SC-to-FC optical connector adapter.
Figure 5C:
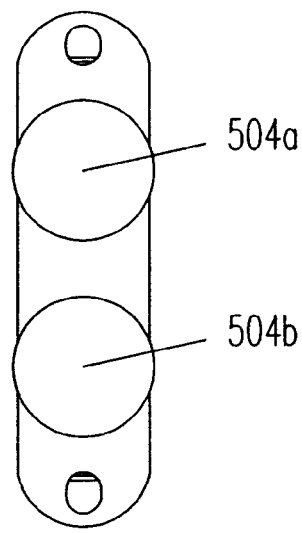
Figure 5A:
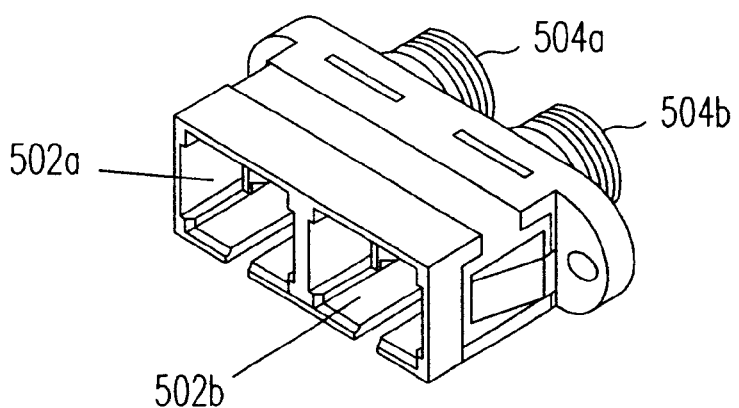

FIGS. 4 and 5 illustrate that an adapter can facilitate a connection between two different connector types. FIG. 4 illustrates a duplex adapter 400 that provides for the mating of SC connectors to connectors that conform to the straight tip ("ST") standard developed by American Telephone and Telegraph ("AT&T"). FIG. 5 illustrates a duplex adapter 500 that provides for the mating of SC connectors to connectors that conform to the face connect ("FC") standard developed by NTT. For each type of connector, an unmated connector that is emitting laser energy poses the hazards discussed above. The need exists for a versatile solution to these hazards; one that works for all connector types.

In the misdirection approach mentioned above, adapters 300, 350, 400, 500 are positioned within the housing chassis 200 in such a way that human exposure to the laser energy emitted by unmated output connectors is improbable. Usually, the adapters 300, 350, 400, 500 are positioned at a steep angle so that the laser energy is directed away from the operator's eyes downwardly toward the ground. Misdirection, however, requires ample space within a housing chassis 200 and is therefore inefficient for high-density systems that contain large amounts of cables with their attendant connectors. In addition, the misdirection approach is not ergonomically efficient for operators to work with.

FIG. 6, including FIGS. 6A, 6B and 6C, illustrates a simplex adapter 600 with a shutter 610. Such an adapter 600 is used in the blocking approach mentioned above, which is traditionally used as an alternative to the misdirection approach. In traditional systems, shutter 610 blocks the laser energy of an unmated output connector when the shutter 610 is closed. As with the other adapters 300, 350, 400, 500 discussed above, adapter 600 is shaped to form a first connector housing 602 into which a connector may be inserted and a second connector housing 604 into which a mating connector may be inserted. The shutter 610 rests in a closed position when no connector is placed into the adapter's first connector housing 602. The shutter 610 swings into an open position to facilitate placement of a connector into the first connector housing 602.

Referring to FIGS. 2, 3 and 6, a disadvantage of the shuttered adapter 600 is the additional amount of space the shutter 610 takes up within the housing chassis 200. The shutter 610 extends beyond two edges of the adapter's 600 first connector housing 602. FIG. 6 illustrates that the shutter 610 therefor requires an additional clearance 612 at one edge of the first connector housing 602. In addition, the shutter requires an additional clearance 614 at another edge of the first connector housing 602. In addition, the shutter also extends the length of the connector by an amount equal to the width of the shutter 610 itself. In order to place two of the simplex shuttered adapters 600 into a vertical position to emulate the vertical duplex orientation illustrated in FIG. 3, the adapters must be placed with sufficient vertical spacing to accommodate the additional clearance 614 required by the shutter 610. FIG. 2 illustrates that the present invention, because it covers only the lower port, does not require such additional vertical spacing. In dense optical communications systems that require large amounts of cables (and therefore connectors), the additional space required by each shuttered adapter 600 is simply not efficiently available within the housing chassis 200.

The shuttered adapter 600 also presents a second drawback. The connector must be removed from the first connector housing 602 (i.e., the connection must be broken) any time the shuttered adapter 600 is installed or removed. For example, if the shutter 610 or other part of the adapter 600 becomes inoperable and needs to be replaced, the connection must be broken (potentially exposing the operator to laser radiation) in order for the adapter 600 to be removed and replaced. This same problem also exists for initial installation of the shuttered adapter 600.

Figure 9A:
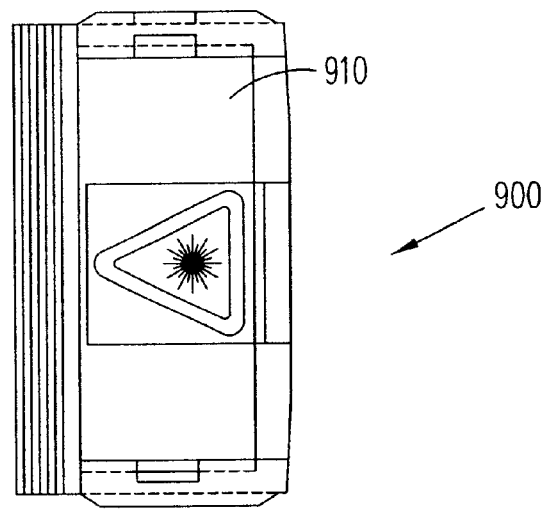
FIGS. 9A and 9B, illustrates front and side views of a duplex SC-to-ST shuttered optical connector adapter.
Figure 9B:
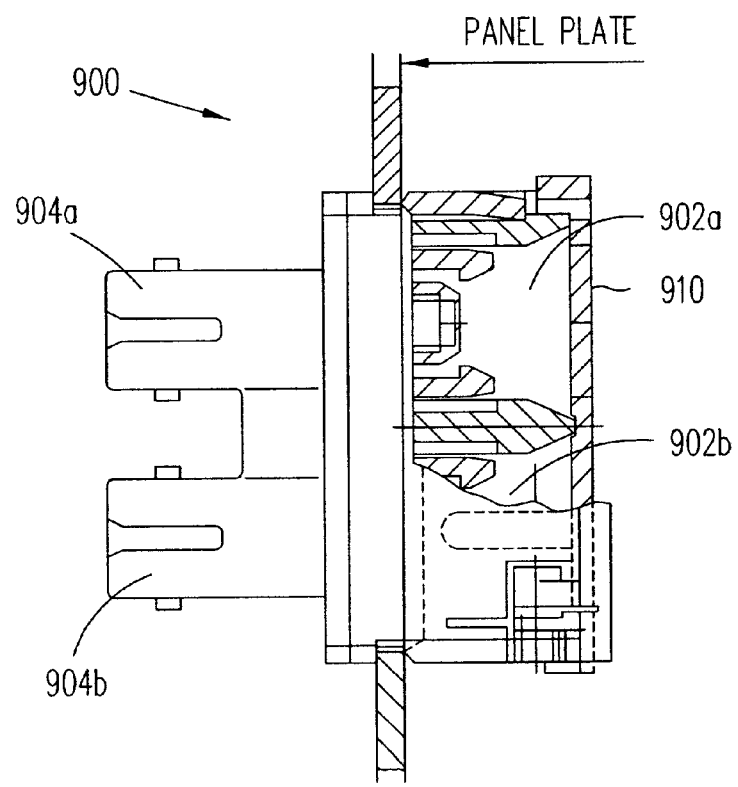

FIG. 9, including FIGS. 9A, 9B, and 9C, illustrates a commercially available duplex shuttered adapter 900. The duplex shuttered adapter 900 is inadequate for use when it is desired to block the laser energy from only the output connector in a duplex adapter. A duplex adapter such as the adapter 900 contains four connector housings 902a, 902b, 902c, 902d. In the arrangement of "in" ports and "out" ports discussed above in connection with the Wavelength Router housing chassis 200, two of the duplex housings 902a, 904b can be used to receive a transmitting cable connector while the other two duplex housings 902b, 904a can be used to receive a receiving cable connector. As is illustrated in FIG. 9, a commercially available duplex adapter with shutter 900 provides a shutter 910 that covers both of the operator-side "in" 902a and "out" 902b duplex connector housings This approach is less than desirable, in that it potentially exposes the operator to both operator-side connector housings 902a, 902b when the shutter 910 is raised. Another drawback of the duplex shuttered adapter 900, as discussed above in connection with the simplex shuttered adapter 600, is that the shutter 910 requires additional room within the housing chassis 200 (FIG. 2) because it exceeds the dimensions of the connector housings 902. This drawback is exacerbated by the fact that the duplex shuttered adapter 900 requires additional clearance that a traditional duplex adapter in both vertical and horizontal directions.

FIGS. 3 through 6 and 9 illustrate that an additional shortcoming of the shuttered adapter approach illustrated in FIGS. 6 and 9 is that each adapter housing 602, 604 is specifically designed to accept only one of a particular connector type. For instance, FIG. 3A illustrates an adapter 300 that is configured to receive and mate SC connectors with other SC connectors. FIG. 4 illustrates an adapter 400 that is configured to receive and mate SC connectors with ST connectors. FIG. 5 illustrates an adapter 500 that is configured to receive and mate SC connectors with FC connectors. The shutter approach is therefore limited in that each shuttered adapter can only be used for a particular type of adapter. Furthermore, in reality, commercially available shuttered adapters are only available for ST-to-ST adapters and are not available for FC or ST connectors.

FIG. 10, including FIGS. 10A, 10B, 10C, and 10D, illustrates a shielding system 1000 (sometimes referred to herein as an "optical safety clip") in accordance with at least one embodiment of the present invention. The system includes a flexible shielding device 1002 extending from the bottom edge of a fastening plate 1004. The optical shielding system 1000 is made of a unitary piece of material that is bent or formed into shape to integrally form the fastening plate 1004 and the shielding device 1002. The unitary construction provides several advantages, including the facts that a unitary piece is less expensive to manufacture and easier to assemble than a system comprising physically independent components.

The shielding device 1002 has a bias portion 1006 that is flexible. The bias portion 1006 extends from the fastening plate 1004 and terminates at the point where the shielding device forms a shield 1008. The embodiment illustrated in FIG. 10 is of unitary metal construction. One skilled in the art will recognize that alternative embodiments of the present invention may be fashioned out of any material, such as plastic, that provides sufficient flexibility and tension to perform the bias function while also blocking laser energy from reaching the operator.

Figure 12:
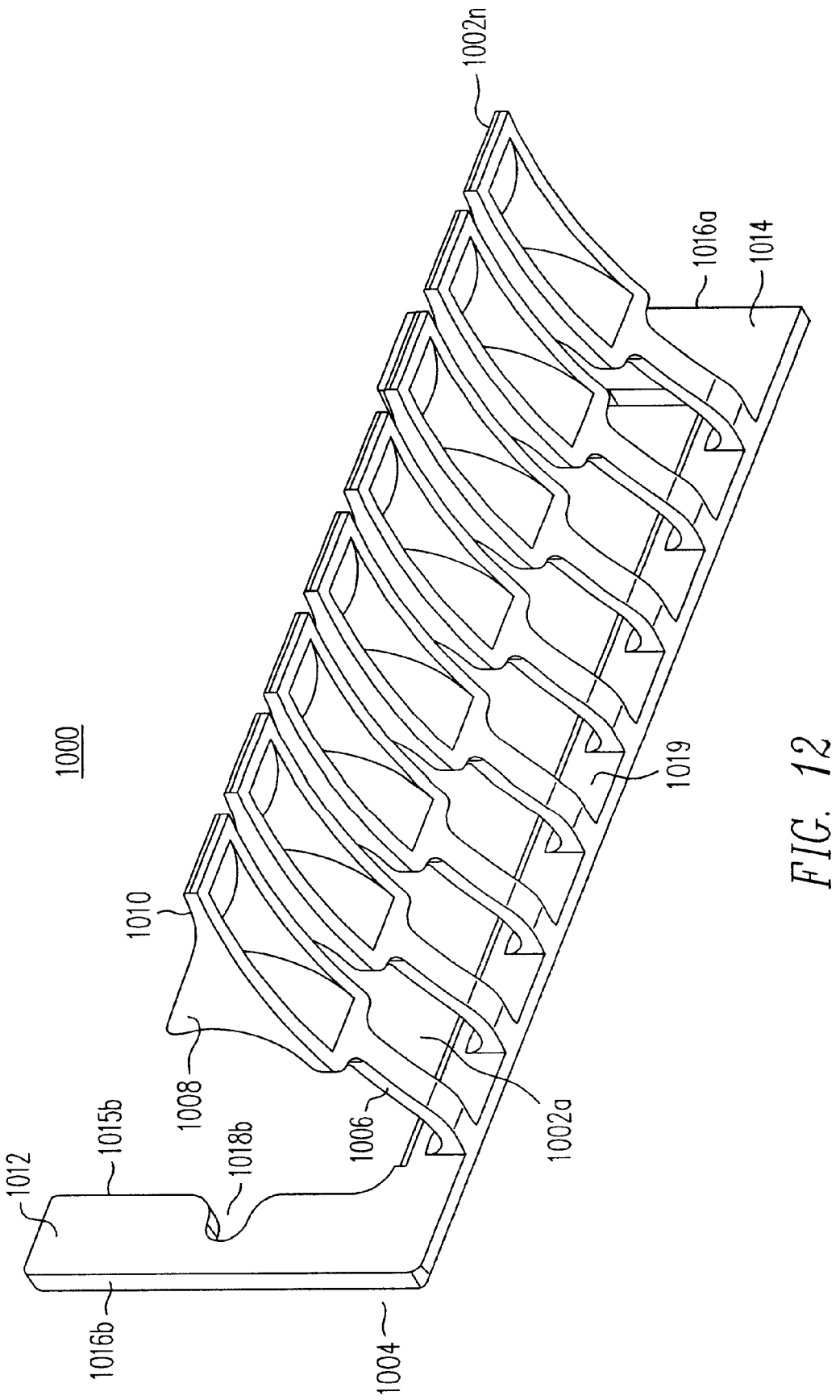
FIG. 12 illustrates a plastic shielding system in accordance with at least one embodiment of the present invention. The use of the same reference symbols in drawings indicates identical items unless otherwise noted.

FIG. 12 illustrates an embodiment of the present invention that is fashioned from plastic.

Figure 11:
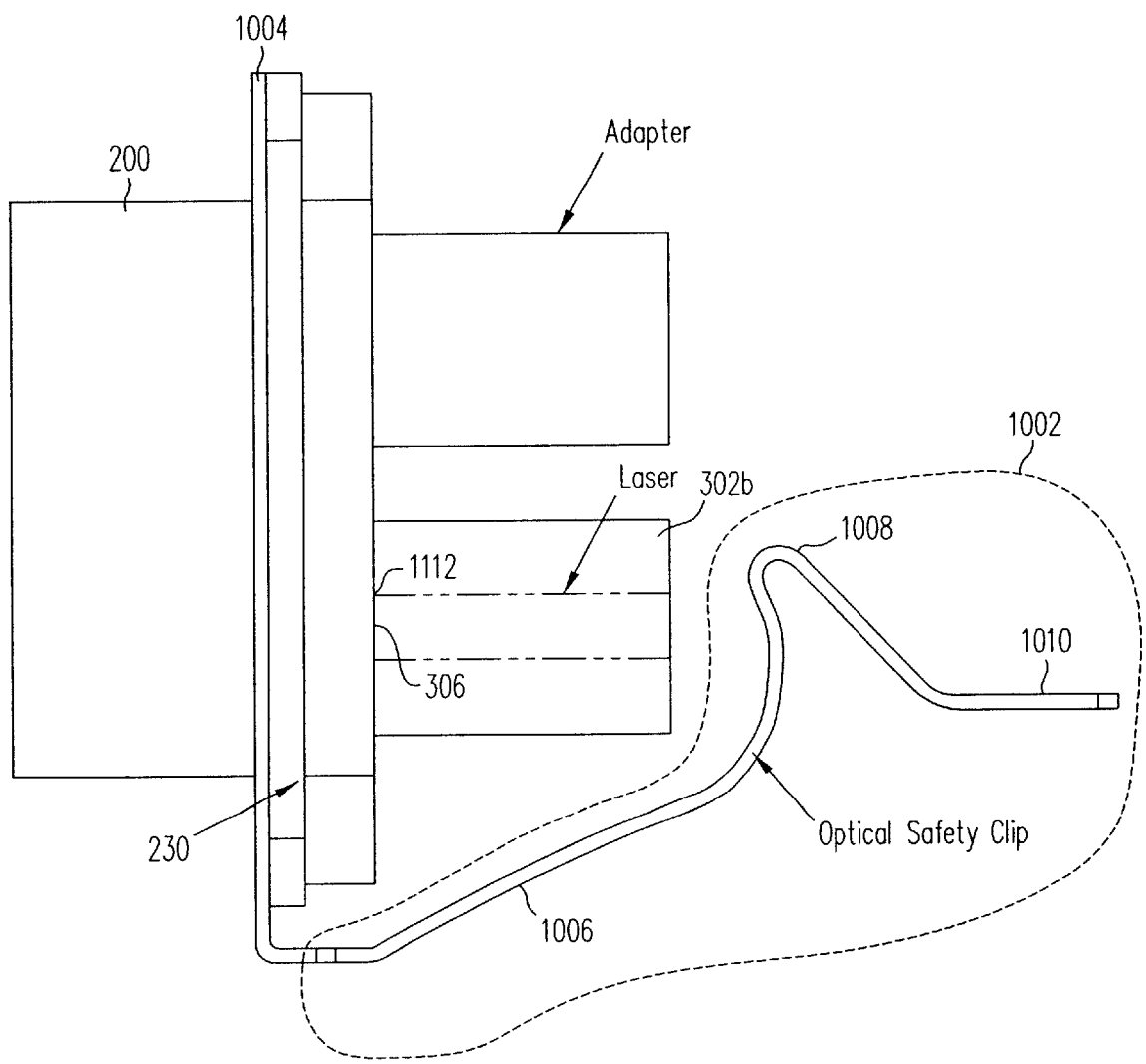
FIG. 11 is a side view of a shielding system in accordance with at least one embodiment of the present invention, where the shield is in the rest position.

Referring to FIG. 11, the shield 1008 is shaped and sized so that it can physically block transmissions from an energy source opening, such as the laser source opening 306 in a connector housing 302b. In particular, the width of the shield 1008 is sized to be at least as wide as the laser source opening 306. FIG. 11 illustrates that, when no mating connector is installed in connector housing 302b, the shield 1008 rests in a position that obstructs the laser energy opening 306, impeding the laser energy from an operator positioned in front of the connector housing 302b.

FIG. 2 illustrates that, when a connector 100b is installed into the connector housing 302b, the bias of the bias portion 1006 allows the shielding device 1002 to deflect from the pressure supplied by the operator, coming to rest in a deflected position. In at least one embodiment, the shielding device 1002 bends elastically along a plane that is perpendicular to the fastening plate 1004. In one embodiment, the shielding device 1002 bends elastically downwardly in a plane that is vertically perpendicular to the fastening plate 1004. One skilled in the art will recognize that bending could alternatively occur along any plane, including a plane that is horizontally perpendicular to the fastening plate 1004. The latter would result in the clip 1008 bending to the side. The shielding device 1002 continues to remain in a deflected position in response to continued pressure supplied by the installed connector 100b. In the deflected position, the shield 1008 clears, and does not block, the laser energy opening 306. When the connector 100b is removed from the connector housing 102b, the bias of the bias portion 1006 causes the shield 1008 to automatically return back to a resting position (assuming that no other force is causing the shield 1008 to remain in a deflected position). When the shield 1008 returns to a rest position, it may or may not return exactly to the initial rest position it occupied before the connector 102b was inserted into the housing 302b. That is, over time the tension of the bias portion 1006 may change due to a prolonged period of bending while the connector 102b is installed. In such case, after the connector 102b is removed, the shield may return to a rest position that is slightly different, but in the vicinity of, it's initial rest position.

Referring to FIG. 11, "in the vicinity of" means that the shield 1006 returns to a rest position that is such that the shield 1006 blocks the laser energy opening 306. That is, the shield 1006 is "in the vicinity" of the initial rest position if the shield blocks the laser energy opening 306, including the topmost edge 1112 of the laser energy opening 306.

Figure 10A:
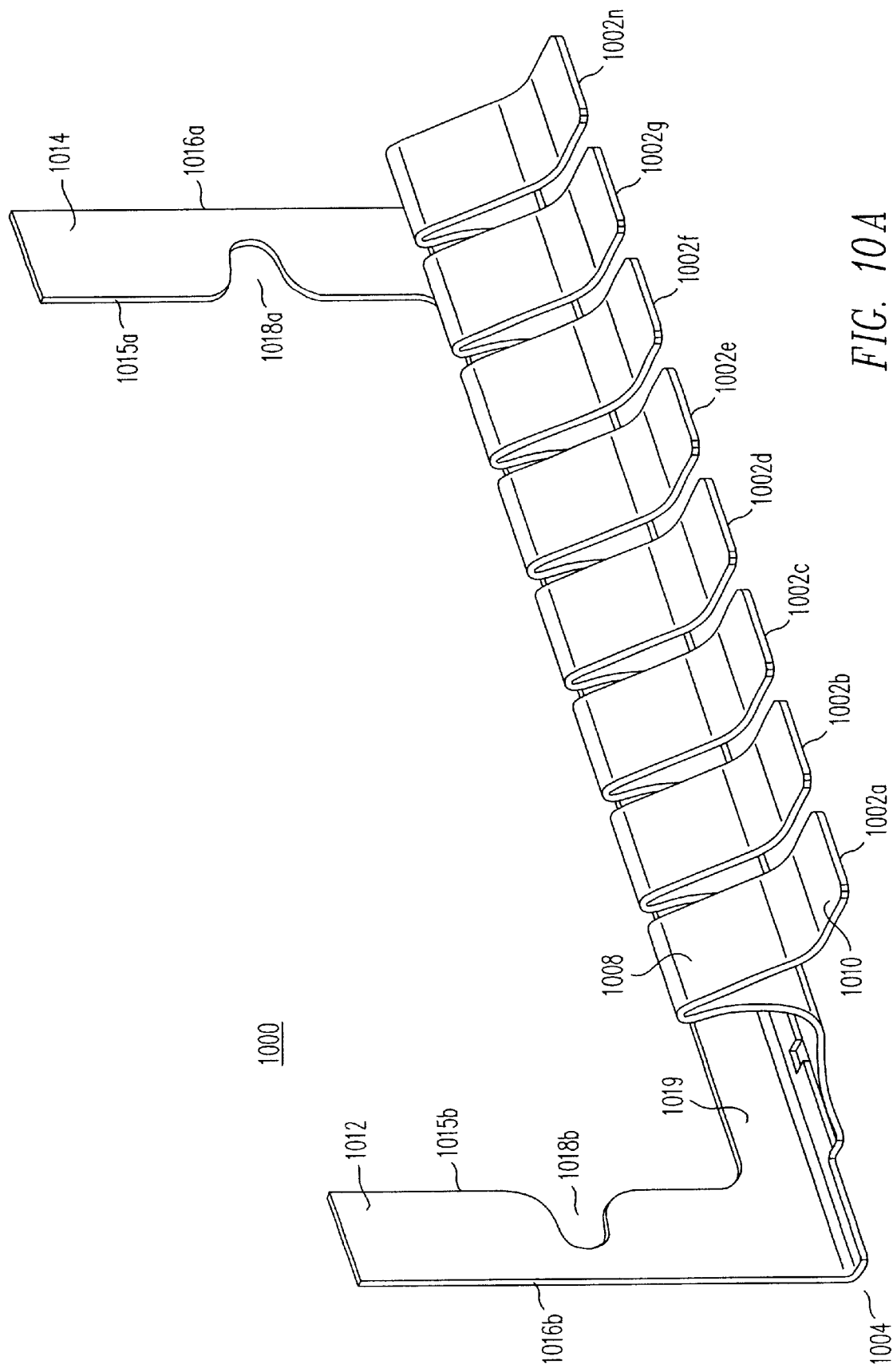
FIGS. 10A, 10B, 10C and 10D, illustrates plan, top, back, and side views, respectively, of a unitary-construction shielding system in accordance with at least one embodiment of the present invention.
Figure 10B:
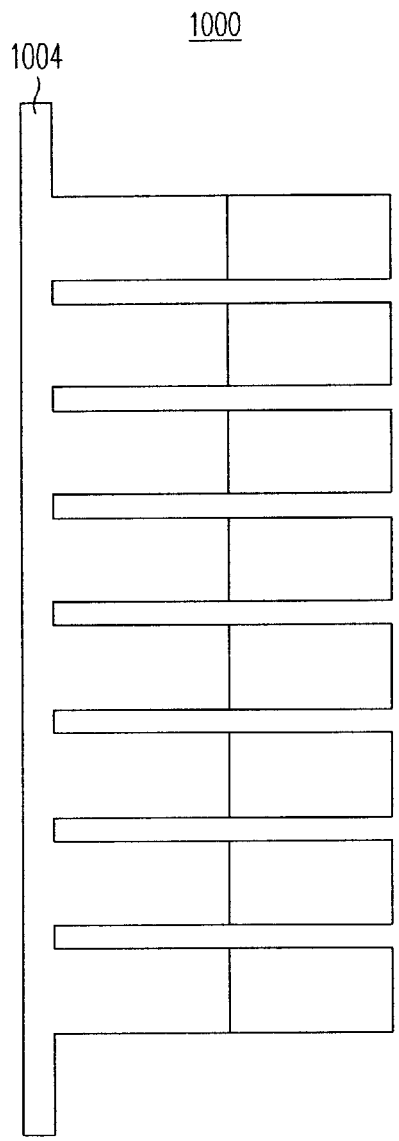
Figure 10D:
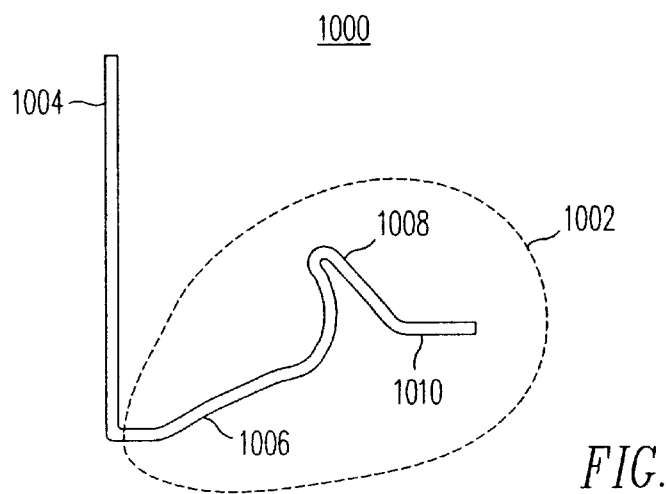

FIGS. 10A and 11 illustrate that the shielding device 1002 further includes a pressure ledge 1010, the ledge 1010 being formed to extend from the shield 1008 and to form the end of the shielding device 1002. The shield 1008 constitutes a relatively triangular-shaped rise in the shielding device 1002 in relation to the bias portion 1006. One skilled in the art will recognize that the shield 1008 may be formed into any shape that will allow the shield 1008 to block the energy source opening 306 (FIG. 3) when the shielding device 1002 is in a rest position.

The ledge 1010 is formed at the base of the shield 1008 and is relatively planar with the bias portion 1006. The ledge 1010 is shaped and positioned such that pressure applied to the ledge causes the shielding device 1002 to deflect from a rest position to a deflected position. This will occur, for instance, when a pressure is applied to the ledge 1010 by a human finger.

The foregoing discussion illustrates that the present invention provides many advantages. One advantage is the flexibility of the present invention to work in conjunction with a variety of connector types. The shield 1008 is designed to be at least as wide as the laser opening for multiple connector types, such as SC-, FC-, and ST-style connectors. In contrast, commercially available shuttered adapters are designed to work only in conjunction with SC-style connectors.

Figure 10C:
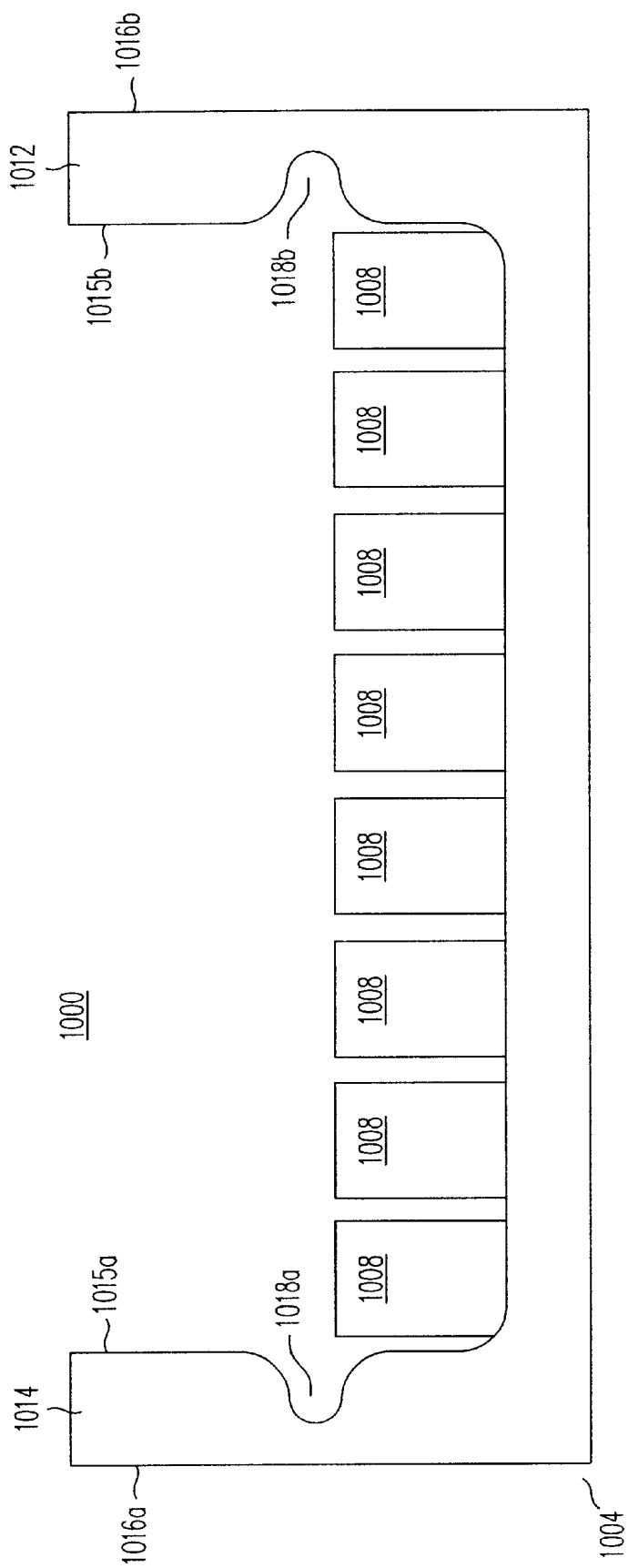

FIG. 10C, which is a back view of the shielding system 1000, illustrates the fastening plate 1004 in further detail. The fastening plate 1004 is configured with its outer edges defining a center portion 1019 and two side portions 1012, 1014 of a relatively U-shaped planar plate 1004. One skilled in the art will recognize that any planar shape will suffice. In the preferred embodiment, the dimensions of the U-shaped fastening plate 1004 are sized and shaped to conform to the 16-port configuration described above in connection with the Wavelength Router housing chassis 200. FIG. 10C further illustrates that the side portions 1012, 1014 of the fastening plate have an inside edge 1015 and an outside edge 1016. The inside edge 1015 of each side portion 1012, 1014 is shaped to form a mounting notch 1018.

Referring to FIGS. 2 and 10C, the mounting notch 1018 is shaped and sized to fit around a securing device 220 such as a screw. The mounting notch 1018 may be sized and shaped to directly come into contact with the securing device 220 in order to secure the fastening plate 1004 to the housing chassis 200. In another embodiment, the mounting notch 1018 is shaped to clear the securing device 220, being designed to be held in place by virtue of being sandwiched between two other components that come into contact with the securing device 220. For instance, the fastening plate 1004 is held in place, in at least one embodiment, by virtue of being coupled between the housing chassis 200 and an interface panel 230 that secures the adapters that provide connector housings 302, where the housing chassis 200 and the interface panel 230 come into contact with the securing device 220.

FIGS. 7 and 10A illustrate that, in at least one embodiment, the shielding system 1000 includes multiple shielding devices 1002a–1002n attached to the fastening plate 1004. For a system based on the 16-port configuration discussed above in connection with the Wavelength Router housing chassis 200, eight shielding devices 1002 are integrally coupled to the fastening plate 1004 in order to cover all eight of the "out" ports. One skilled in the art will realize that the shielding system 1000 with multiple shielding devices 1002a–1002n can be used with a heterogeneous group of adapters. Even if different types of adapters are mounted in the interface panel 230, only one shielding system need be mounted, as it will provide a shielding effect for multiple types of adapters. Unlike shuttered adapters, the shielding system may remain in place while adapters are installed, removed, or interchanged within the interface panel 230.

FIG. 8 illustrates an optical fiber communications system 800 that includes multiple shielding systems 1000. For instance, the Wavelength Router housing chassis 200 contains thirty-two 16-port interface panels 230. For each panel 230, a shielding system 1000 provides a shield 1008 for each "out" port on the panel 230. FIG. 8 illustrates the tightly packed configuration of adapters 400 necessary in a densely packaged fiber optic cable system. FIG. 8 illustrates a useful feature of the sizing of the shield 1008. The width of the shield 1008 does not exceed the width of the connector housing of the adapter 400, even when the shield 1008 is used with a duplex adapter 400. This contrasts with the shuttered duplex adapter 900 (FIG. 9), which requires additional horizontal clearance outside the adapter housing.

Alternative Embodiments

Other embodiments are within the scope of the following claims. For example, while the specific implementation discussed above contemplates that the energy source emitting from the energy source opening 306 is a laser source, it will be appreciated that a shielding system in accordance with the present invention will be applicable to a system that emits any energy source, such as another form of light wave, such as an X-ray.

Also, for example, while a relatively planar bias portion 1006 is disclosed, it will be appreciated that other types of bias mechanisms, such as springs, are within the scope of the invention.

Also, for example, while particular types of connectors have been discussed to illustrate particular features of various embodiments of the shielding system described above, it will be appreciated that the shielding system 1000 in accordance with the present invention can be used with any type of optical connector, including connectors conforming to the enterprise systems connection ("ESCON") standard and those conforming to the Fiber Distributed Data Interface ("FDDI") standard, both of which were developed by International Business Machines ("IBM"). The shielding system 1000 in accordance with the present invention is also suitable for shielding multiple fiber optic connectors based on the NT ferrule.

Also, for example, while the shielding system may be utilized in conjunction with removable connectors that can be placed into connector housings, one skilled in the art will appreciate that, because the fastening plate of the shielding device can be installed without disrupting the position of the connectors, the shielding system can also be utilized as a prophylactic safety feature of a system that utilizes fixed connectors.

Also, for example, the pressure force that causes the shielding device to move from a rest position to a deflected position need not necessarily be applied to the pressure ledge. One skilled in the art will recognize that a pressure force applied to any portion of the shielding device, including the shield or the bias portion, will cause bending of the shielding device. It will also be recognized that, while a pressure is such applied, a connector can be inserted into the housing chassis. However, one skilled in the art will recognize that one might wish to move the shielding device into a deflected position for some other purpose, and that it may or may not be necessary that the shield clear the energy source opening for such purpose. It will also be recognized that, during the time that a connector remains installed in the connector housing, the shielding device may come to rest in a deflected position (in response to the obstruction force supplied by the installed connector) that is different than the position of the shielding device when responding to a pressure force.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A shielding system that obstructs an energy source opening in a connector housing, the connector housing being oriented to receive a connector, the shielding system comprising:
    a flexible unitary-construction shielding device including:
        a bias portion integrally coupled to a shield;
        a ledge integrally coupled to the shield and oriented to be accessible to a user when a connector housing to which the shielding device is attached receives a connector, and;
        a U-shaped fastening plate integrally coupled to the shielding device and having a plurality of outer edges defining a center portion and two side portions, wherein at least one of the two side portions includes a mounting notch;
    the shielding device being configured to rest in a first position, wherein the shield obstructs the energy source opening when the shielding device is in the first position;
    the shielding device being configured to deflect from the first position to a second position when a pressure force is applied to the ledge of the shielding device, wherein the shield does not obstruct the energy source opening when the shielding device is in the second position;
    the shielding device being configured to a deflected position in response to an obstruction force; and
    the shielding device being configured to return to a position in the vicinity of the first position when the obstruction force is removed from the shielding device.

2. The system recited in claim 1 wherein the energy source opening further comprises an opening oriented to provide a fiber optic laser source.

3. The system recited in claim 1 wherein the shielding device is further configured to bend along a plane perpendicular to the fastening plate.

4. The system recited in claim 1, further comprising a plurality of shielding devices.

5. The system recited in claim 4 further comprises a fastening plate, the fastening plate being integrally coupled to each of the plurality of shielding devices.

6. The system recited in claim 1 wherein the width of the shield is at least as wide as the energy source opening.

7. The system recited in claim 4 wherein the width of each of the plurality of shields is at least as wide as the energy source opening.

8. The system recited in claim 1 wherein the shielding device is a single-piece, integral device formed from metal.

9. The system recited in claim 1 wherein the shielding device is a single-piece, integral device formed from plastic.

10. The shielding system recited in claim 1 is a single-piece, integral system formed from metal.

11. The shielding system recited in claim 1 is a single-piece, integral system formed from plastic.

12. A system that obstructs an energy source, comprising:
    a housing chassis;
    at least one connector housing coupled to the housing chassis, the at least one connector housing having an energy source opening and being oriented to receive a connector; and
    a unitary-construction shielding device having a U-shaped fastening plate including a plurality of outer edges defining a center portion and two side portions, wherein at least one of the two side portions includes a mounting notch, the shielding device further including:

a bias portion integrally coupled between the fastening plate and a shield;

a ledge integrally coupled to the shield and oriented to be accessible to a user when the at least one connector housing receives the connector, and;

the shielding device being configured to rest in a first position, wherein the shield obstructs the energy source opening when the shielding device is in the first position;

the shielding device being configured to deflect from the first position to a second position when a pressure force is applied to the ledge of the shielding device, wherein the shield does not obstruct the energy source opening when the shielding device is in the second position;

the shielding device being configured to maintain a deflected position in response to an obstruction force; and the shielding device being configured to return to a position in the vicinity of the first position when the obstruction force and the pressure force are removed from the shielding device.

13. The system recited in claim 12 wherein the energy source opening further comprises an opening oriented to provide a fiber optic laser source.

14. The system recited in claim 12 wherein the shielding device is further configured to deflect along a plane perpendicular to the fastening plate.

15. The system recited in claim 12, further comprising a plurality of shielding devices.

16. The system recited in claim 15, the fastening plate being integrally coupled to each of the plurality of shielding devices.

17. The system recited in claim 12 wherein the width of the shield is at least as wide as the energy source opening.

18. The system recited in claim 15 wherein the width of each of the plurality of shields is at least as wide as the energy source opening.

19. The system recited in claim 12 wherein the shielding device is a single-piece, integral device formed from metal.

20. The system recited in claim 12 wherein the shielding device is a single-piece, integral device formed from plastic.

21. A method for providing a shielding system that obstructs an energy source, comprising:

providing a housing chassis;

providing at least one connector housing, the at least one connector housing having an energy source opening and being oriented to receive a connector;

coupling the at least one connector housing to the housing chassis;

providing a flexible shielding device having a U-shaped fastening plate including a plurality of outer edges defining a center portion and two side portions, wherein at least one of the two side portions includes a mounting notch;

coupling the fastening plate to the housing chassis while the connector is coupled to the connector housing;

the shielding device including a bias portion, the bias portion being coupled between the fastening plate and a shield, the shield being at least as wide as the energy source opening;

the shield device being configured to rest in a first position, wherein the shield obstructs the energy source opening when the device is in the first position;

the shielding device being configured to deflect from the first position to a second position when a pressure force is applied to the shielding device, wherein the shield does not obstruct the energy source opening when the shielding device is in the second position;

the shielding device being configured to maintain a deflected position in response to an obstruction force; and the shielding device being configured to return to a position in the vicinity of the first position when the obstruction force is removed from the shielding device.

22. The method recited in 21, the energy source opening further comprising an opening oriented to provide a fiber optic laser source.

23. A shielding system that obstructs an energy source opening within a connector housing, the connector housing being coupled to a housing chassis, comprising:

a unitary-construction shielding device, the shielding device including:

a shield means for blocking the energy source opening;

a ledge means for receiving a pressure force, the ledge means being coupled to the shield means and oriented to be accessible to a user when the connector housing receives a connector, and;

a bias means for biasing the shielding device to deflect from a first position to a second position in response to the pressure force, the bias means further biasing the shielding device to remain in a deflected position in response to an obstruction force, the bias means further biasing the shielding device to return to a position in the vicinity of the first position when both the pressure force and the obstruction force are absent, where the shield means obstructs the energy source opening when the shielding device is in the first position, where the shield means does not obstruct the energy source opening when the shielding device is in the second position and where the shield means does not obstruct the energy source opening when the shielding device is in the deflected position; and a U-shaped fastening means that provides a fastening surface that can be coupled to the housing chassis and includes a plurality of outer edges defining a center portion and two side portions, wherein at least one of the two side portions includes a mounting notch, the fastening means being integrally coupled to the shielding device.

24. The system recited in claim 23 wherein the'shield means is between the bias means and the ledge means.

* * * * *